(12) United States Patent
Lizotte (10) Patent No.: US 7,820,089 B2
(45) Date of Patent: Oct. 26, 2010

(54) METHOD FOR MANUFACTURING THREE DIMENSIONAL ELECTRODE ELEMENTS FOR MICRO-BATTERIES

(75) Inventor: Todd E. Lizotte, Hooksett, NH (US)

(73) Assignee: Hitachi Via Mechanics, Ltd., Kanagewa (JP)

( * ) Notice: Subject to any disclaimer, the term of this patent is extended or adjusted under 35 U.S.C. 154(b) by 0 days.

(21) Appl. No.: 12/351,304

(22) Filed: Jan. 9, 2009

(65) Prior Publication Data
US 2009/0179354 A1   Jul. 16, 2009

Related U.S. Application Data

(60) Provisional application No. 61/020,453, filed on Jan. 11, 2008.

(51) Int. Cl.
*B29C 59/16* (2006.01)
(52) U.S. Cl. .................... 264/154; 264/400
(58) Field of Classification Search .......... 264/400, 264/154
See application file for complete search history.

(56) References Cited

U.S. PATENT DOCUMENTS

| | | | |
|---|---|---|---|
| 6,311,004 B1 * | 10/2001 | Kenney et al. | 385/130 |
| 6,409,308 B1 * | 6/2002 | Maher et al. | 347/47 |
| 6,563,998 B1 | 5/2003 | Farah et al. | |
| 2002/0033558 A1 * | 3/2002 | Fahey et al. | 264/400 |
| 2008/0041560 A1 * | 2/2008 | Paradis et al. | 165/67 |
| 2008/0089637 A1 * | 4/2008 | Farah | 385/14 |

* cited by examiner

*Primary Examiner*—Joseph S Del Sole
*Assistant Examiner*—Kimberly A Stewart
(74) *Attorney, Agent, or Firm*—Davis & Bujold, P.L.L.C.

(57) ABSTRACT

A method for forming an array of three dimensional electrode elements for micro-batteries, including forming a plurality of first parallel channels in a substrate, filling the plurality of first channels with a sacrificial filler material, forming at least one plurality of second parallel channels, each of the pluralities of channels being oriented in a different direction, and removing the sacrificial filler material to leave a grid array of electrode elements. The method may further include a preliminary step of depositing a sacrificial coating onto the surface of the substrate and a final step of removing the sacrificial coating and any debris resulting from the channel forming steps deposited thereon.

20 Claims, 6 Drawing Sheets

Fig.1

Fig. 2A - IMAGE UV LASER ONE CHANNEL / STEP AND REPEAR

Fig. 2B - IMAGE UV LASER ALL CHANNELS AT ONCE, SINGLE AXIS

Fig.2C - FOCAL OR IMAGED LASER SPOT (UV OR IR LASER WAVELENGTH)

Fig.3 - FILLING

Fig.4 - CUTTING OPPOSITE DIAGRAM TO MAKE SQUARE COLUMNS

Fig.6 - REMOVING FILLER

SQUARE
Fig.5A

HEX
Fig.5B

OCTAGANOL
Fig.5C

Fig.7A

COLUMNS

SACRIFICIAL FILLER

SACRIFICIAL FILLER

Fig.7B - VIEW A

METHOD FOR MANUFACTURING THREE DIMENSIONAL ELECTRODE ELEMENTS FOR MICRO-BATTERIES

CROSS REFERENCES TO RELATED APPLICATIONS

The present U.S. patent application claims benefit of U.S. Provisional Patent Application Ser. No. 61/020,453 filed Jan. 11, 2008.

FIELD OF THE INVENTION

The present invention relates to an improved method for manufacturing micro-batteries and, in particular, to an improved method of high aspect laser or mechanical microstructuring, micro-machining and micro-cutting of organic and inorganic materials using a water or solvent soluble coating/filler material media technique to form free standing pillars or columns of material for use as three dimensional electrode elements in micro-batteries.

BACKGROUND OF THE INVENTION

Small micro-batteries, such as commonly used in, for example, miniature and portable electronic devices such as cardiac pacemakers, hearing aids, smart cards, remote sensors and personal communications devices such as cell phones and hand held/personal computer devices, commonly do not provide desired power and energy densities because the packaging, internal hardware and electrode/element architectures for efficient battery designs to not scale well to the dimensions required for such applications.

The associated methods of the prior art for manufacturing micro-batteries having improved power and energy densities approaching those of conventional batteries constructed of two dimensional electrode elements include the use of high aspect ratio three dimensional electrode array architectures. Such three dimensional electrode element arrays are commonly used to form the anodes of micro-batteries and, when used to form three dimensional anode element arrays, are made of suitable materials, such as zinc, and in other instances, and again for example, are created by the microstructuring of a photo-resist, such as SU-8, with subsequent pyrolsis of the formed SU-8 to transform the formed SU-8 into highly order graphite, which in general is considered a better approach than the use of zinc anode material.

The manufacture of such three dimensional battery element arrays requires high volume batch production methods, but the manufacturing methods of the prior art have been generally unsatisfactory with regard to both yield rate and electrode element array quality.

The method of the present invention provides a solution to these and related problems of the prior art.

SUMMARY OF THE INVENTION

The present invention is directed to a method for forming an array of three dimensional electrode elements for use in, for example, micro-batteries, including the steps of forming a substrate of a material suitable for use as an electrode element, forming a plurality of first parallel channels in the substrate, each of the first channels being oriented in a first direction, filling the plurality of first channels with a sacrificial filler material, forming at least one plurality of second parallel channels, each of the plurality of channels being oriented in a direction non-parallel to the other channels, and removing the sacrificial filler material to leave a grid array of electrode elements.

The method may further include a preliminary step of depositing a sacrificial coating onto the surface of the substrate and a final step of removing the sacrificial coating and any debris resulting from the channel forming steps deposited thereon.

The substrate is a polymer substrate comprised of one of a polyimide film, a photo-resist film and a cast polyimide wafer and is preferably one of a polyimide wafer and a polyimide/amide substrate and is one of compression cast and isostatically compression molded.

The channels are typically blind hole or depth channels and are formed by one of repeated laser machining steps using one of a single UV (ultraviolet) laser beam and a focal or imaged UV or IR (infra-red) laser spot and the formation of multiple channels in a single laser machining step by the concurrent use of multiple UV laser beams.

The sacrificial filler material is comprised of one of a water soluble material and a solvent soluble material and the sacrificial coating is preferably comprised of a water soluble coating, such as polyvinyl alcohol.

BRIEF DESCRIPTION OF THE DRAWINGS

Various embodiments of the invention will now be described, by way of example, with reference to the accompanying drawings, in which:

FIGS. 5A, 5B and 5C are diagrammatic illustrations of the geometric shapes that may be achieved in the pillar or columns forming the three dimensional electrode elements of a three dimensional battery element array; and, FIGS. 7A and 7B are diagrammatic illustrations of the steps of a further method for the mitigation of debris in the manufacture of the three dimensional electrode elements of a three dimensional battery element array, in which

DESCRIPTION OF PREFERRED EMBODIMENTS

Figure 1:
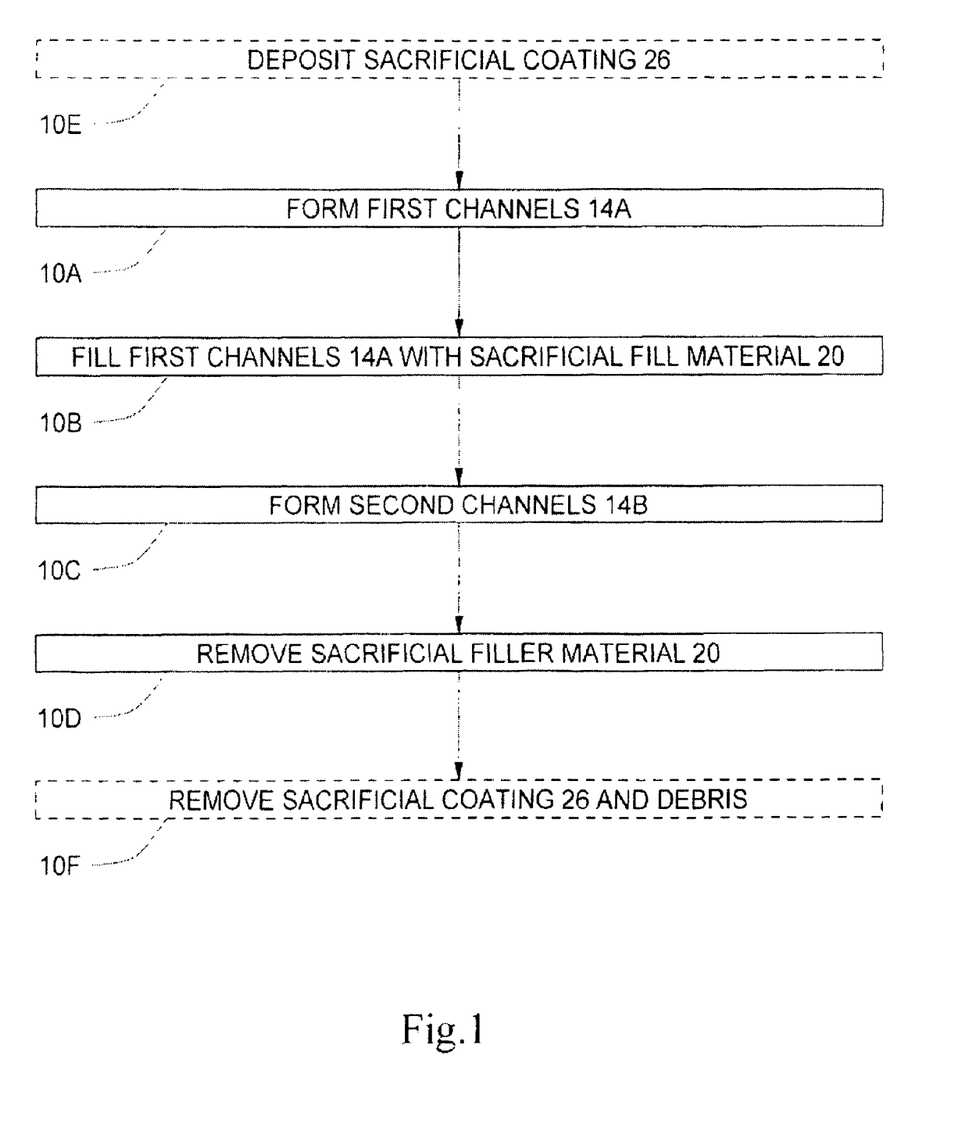
FIG. 1 is a flow diagram of the method of the present invention for forming a three dimensional array of microbattery elements'
Figure 2A:
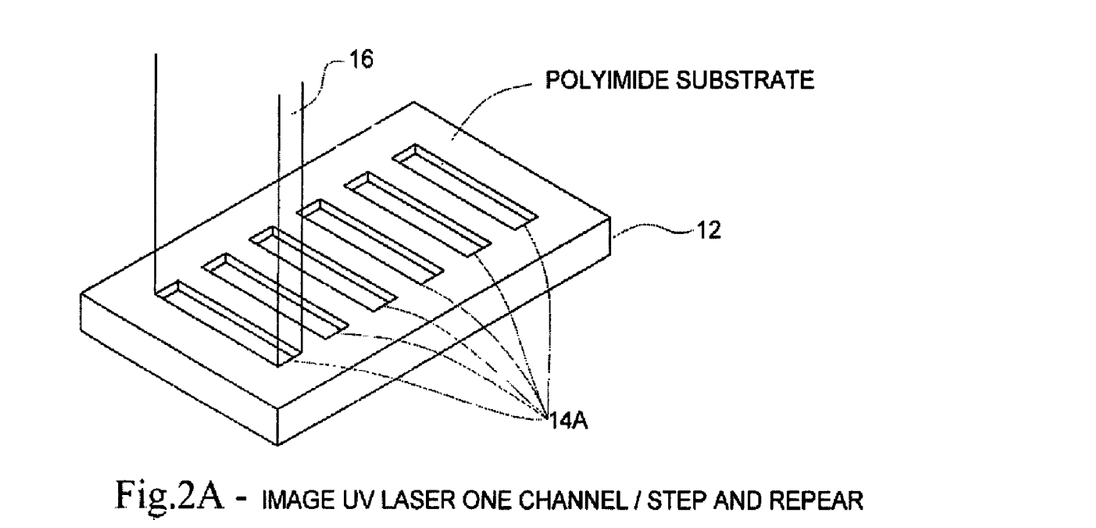
FIGS. 2A, 2B, 2C, 3, 4 and 6 are diagrammatic illustrations of the sequential steps in the method for the manufacture of a three dimensional battery element array.
Figure 2B:
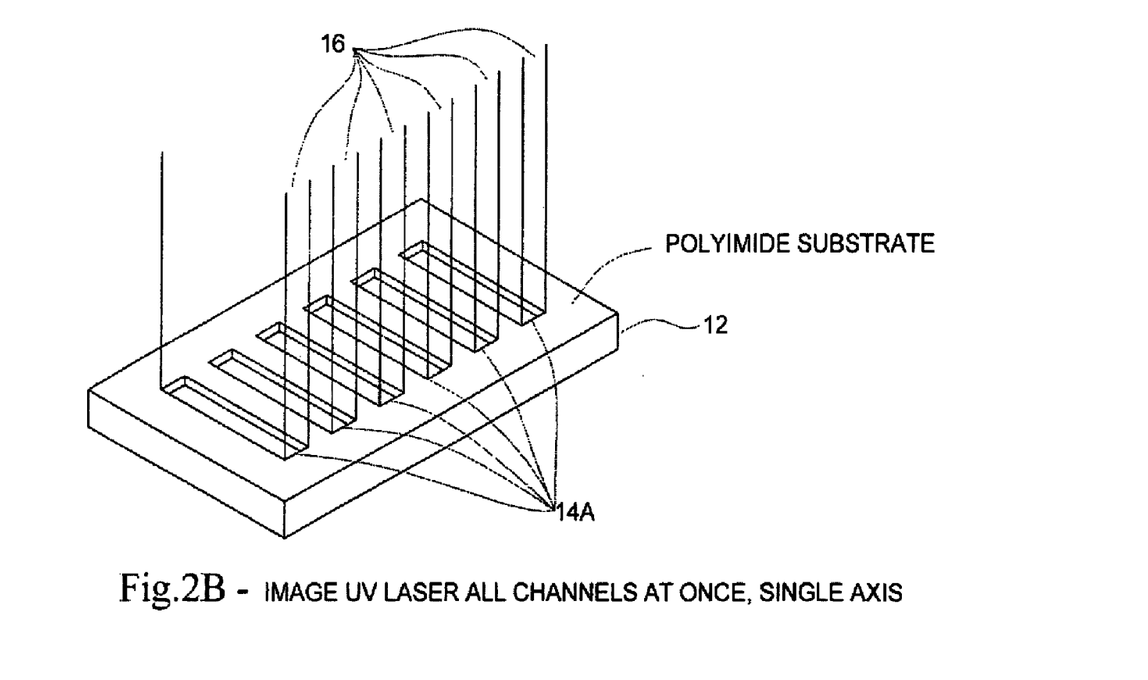
Figure 2C:
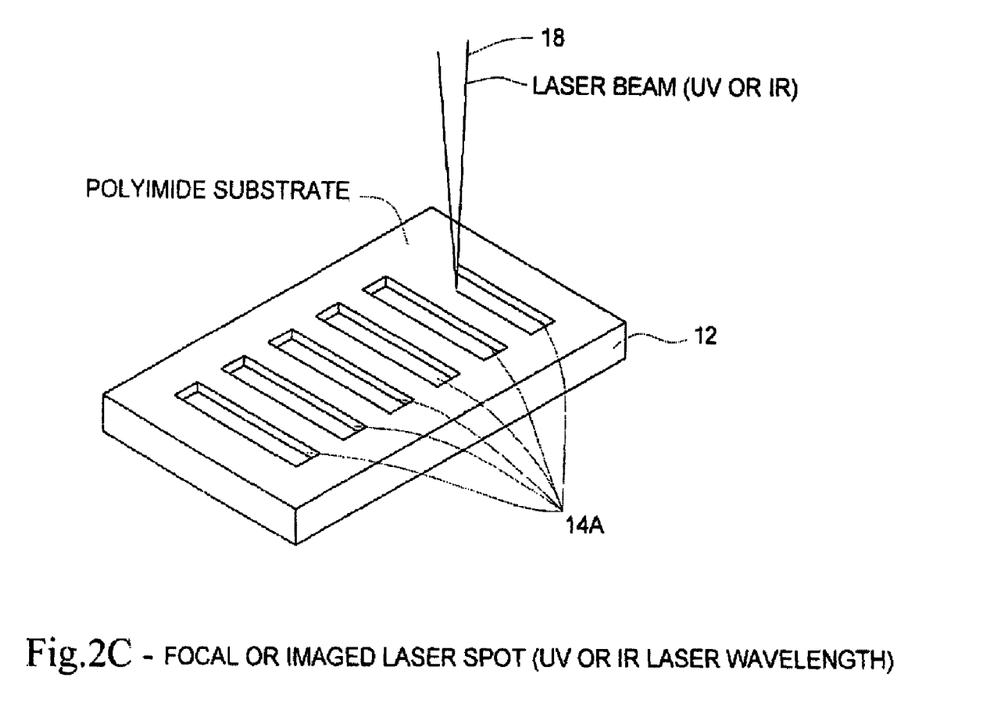

The process of the present invention for forming a three dimensional electrode element array is illustrated in FIG. 1, with the individual steps of the process being illustrated, in further detail, in FIGS. 2A, 2B, 2C, 3, 4 and 5. As illustrated in FIG. 1 and FIGS. 2A-2C, in the initial step 10A in the microstructuring process of the present invention, for forming a substrate 12 to be eventually formed into a microbattery, comprises forming a series of parallel channels 14A running in one direction in the substrate 12. In particular, FIGS. 2A, 2B and 2C illustrate the formation of a first set of plurality of blind hole or depth channels 14A into the substrate 12 which comprises, for example, a polymer substrate, such as a thick polyimide film, e.g., cast SU-8, a thick photo-resist film, a cast polyimide wafer or some other suitable substrate material which, according to the present invention, can be directly machined by a laser or a micro-saw, rather than formed by photo-imaging processes, such as conventional in the prior art of mocro-battery technology. FIGS. 2A, 2B and 2C, respectively, illustrate the formation of channels 14A, one at a time in the substrate 12, by repeated laser machining steps using a single UV (ultraviolet) laser beam 16, or possibly the formation of multiple channels 14A in a single laser machining step by the concurrent use of multiple UV laser beams 16, and by the use of a focal or imaged UV or IR (infra-red) laser spot 18. It will be understood by those of ordinary skill in the relevant arts that this initial step in the process can also be performed, for example, by the use of a micro-saw or saws or other similar techniques.

Figure 3:
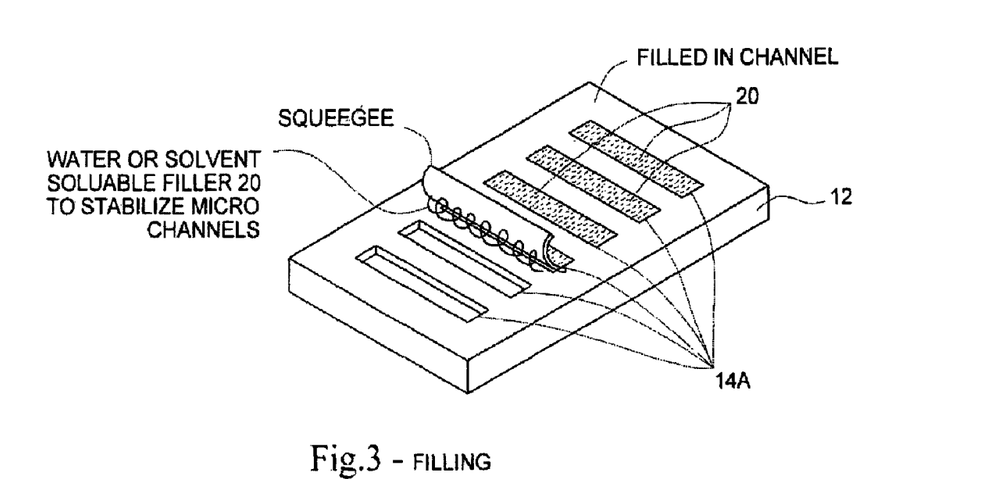

In step 10B and as illustrated in FIG. 3, the blind hole or depth channels 14A are then filled with a sacrificial filler material 20 comprised, for example, of a water soluble or a solvent soluble coating, possible applied to the blind hole or depth channels 14A via the aid of a squeegee device 22, wherein filler material 20 typically can be and preferably is placed under vacuum so that trapped air is removed from the water or solvent soluble coating, thereby allowing filler material 20 to completely fill the blind hole or depth channels 14A from bottom to top and sidewall to sidewall. The filler material 20 is then allowed to settle and is cured by, for example, UV radiation if filler material is a photo sensitive material, or heating, if the filler material 20 is a water soluble material.

Figure 4:
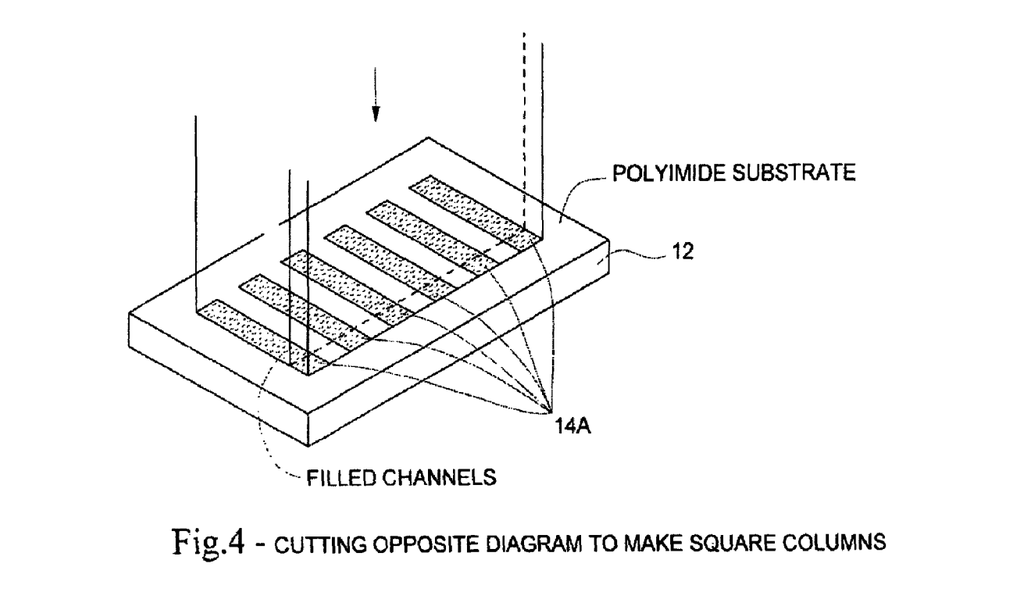

In step 10C, which is illustrated in FIG. 4, a second set of a plurality of parallel blind hole or depth channels 14B are cut across the substrate 12, at an angle to first set of plurality of blind hole or depth channels 14A, such as being cut a 90° relative to the first set of plurality of parallel blind hole or depth channels 14A, again by means of, for example, a laser 16 or a micro-saw 18, with previously cut first set of plurality of blind hole or depth channels 14A being supported and stabilized during the process by the filler material 20 filling the first set of plurality of blind hole or depth channels 14A.

Figure 5A:
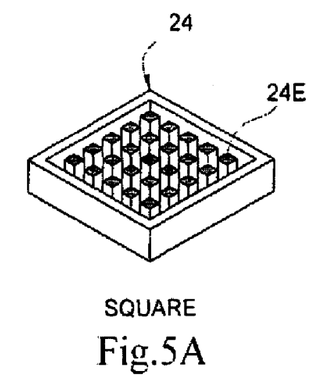
Figure 5B:
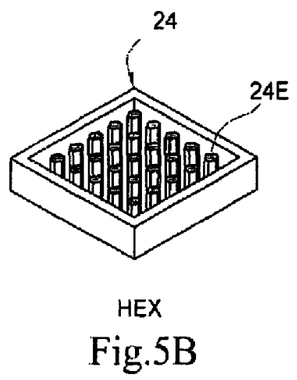
Figure 5C:
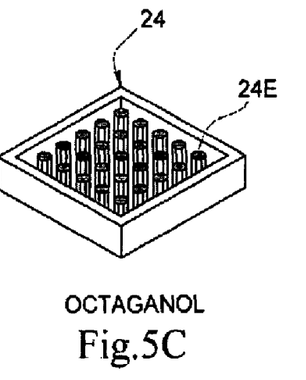

As illustrated in FIGS. 5A, 5B and 5C, the cutting of one or more subsequent sets of parallel channels 14B will leave a grid array 24 of columns or pillars of the substrate 12 material forming vertical electrode elements 24E having, for example, either a square, a rectangular, a hexagonal, an octagonal or even circular geometric cross sections, dependent upon the number and orientation of channels 14B.

Figure 6:
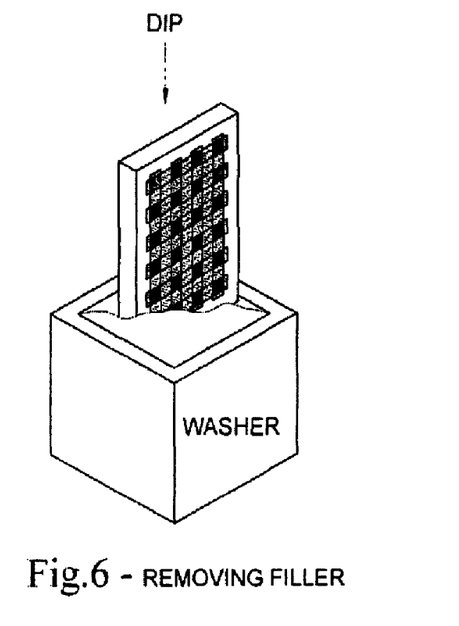
Figure 7A:
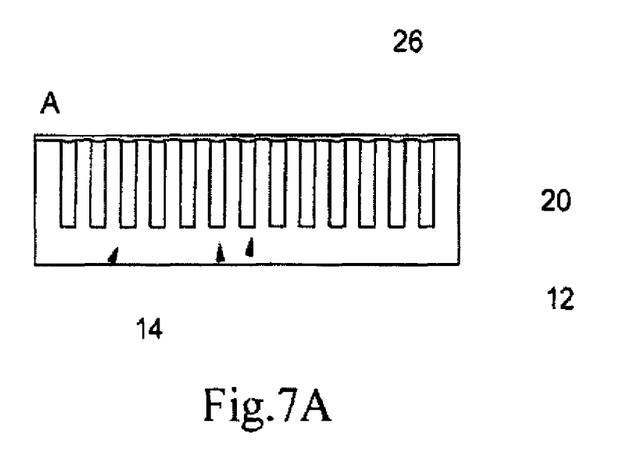
Figure 7B:
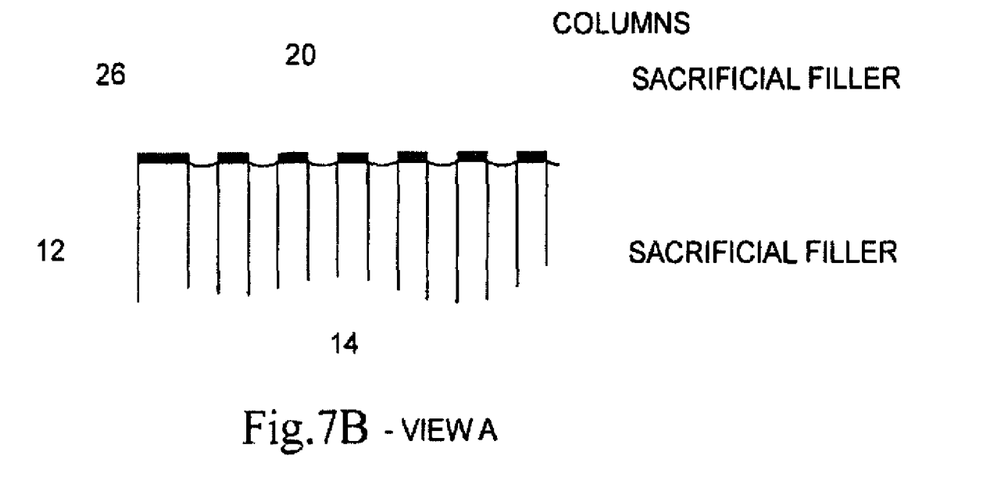
FIG. 7B is an enlarged view of a section of FIG. 7A.

When the cutting of second set of plurality of blind hole or depth channels 14B is completed, the filler material 20 is removed in step 10D, e.g., by dipping the substrate 12 is a washing or solvent fluid as illustrated in FIG. 6, thereby leaving grid array 24 of electrode elements 24E without any sacrificial filler material 20, as show in FIGS. 7A and 7B.

The method of the present invention as illustrated in FIG. 1 may further include process steps for the mitigation and removal of debris resulting from the channel 14A/14B cutting processes, which has typically been a problem with such processes when attempted in the prior art. This debris is typically carbon residue formed during the breaking of the molecular chain of the base polymer of substrate 12 during the cutting of channels 14A/14B and forms due to the ablative nature of UV micromachining or microstructuring processes.

Accordingly, the method of the present invention may further include a preliminary step 10E, which is the spinning or spraying of a meniscus of a sacrificial water soluble coating 26, onto the surface of substrate 12 to coat the surface of substrate 12 before the first channel 14A cutting process in step 10A, wherein coating 26 may, for example, be comprised of a material such as polyvinyl alcohol (PVA), and a final step 10F, which is the removal of the sacrificial water soluble coating 26 from the completed array 24 by a simple aqueous cleaning process after step 10D. According to the present invention, therefore, the debris formed by the laser cutting processes are allowed to eddy out of the plasma plume and deposit on top of sacrificial water soluble coating 26, so that the debris is subsequently removed from the completed array 24 with the coating 26. It should also be noted that the PVA or similar materials can be tailored to respond to, for example, a heated bath or even a cold water bath.

Lastly considering exemplary specific embodiments of the above described method for purposes of illustration of the present invention, a suitable and presently preferred substrate material for a micro battery application is a polyimide wafer or polyimide/amide substrate which is compression cast or isostatically compression molded, instead of formed by other film casting techniques. It should also be noted that the polyimide wafer or polyamide wafer could have fillers such as Teflon, FEP or ceramic or glass particles that are added to increase the temperature stability of the material. In such embodiments the process parameters discussed below may change slightly, but will typically remain within the ranges indicated below.

Pulsed UV lasers with wavelengths form 400 nm to 157 nm with short or extremely ultra-short pulses, such as nanoseconds, pico and to femto ranges are presently preferred for processing most inorganic and organic materials, such as cutting the first and second set of blind holes or channels 14A/14B in the substrates 12. For the particular application of the manufacture of micro-batteries, using an excimer or frequency tripled or quadrupled Nd:YAG laser or other lasers such as Nd:YLF, etc. which can produce wavelengths within the UV range with corresponding pulse durations as previously outlined above, are able to process polyimide, polyamide and filled versions of plyimide/amides with great precision as long as an appropriate energy density and pulse duration is found that precisely and with a high degree of finessed, microstructures or micromachining the material to sub-micron tolerances and with negligible thermal heat affected zones.

For example, the process of the present invention may be performed according to the following parameters:

| | |
|---|---|
| Laser wavelength: | 248 nm, 266nm (However, 355nm and 351 can be used); |
| Pulse duration: | 5 to 250 nanoseconds (However, sub-nanosecond and ultra-short pulses (Pico and Femto second pulse durations) could improve the quality and possibly reduce the cost); |
| Energy Density: | 0.0 - 8 Joules per square centimeter (Optimum 4 J/cm$^2$); |
| Beam Homogeneity: | Intensity uniformity across spot or image - ≦10% Intensity; |
| Process Gas: | Nitrogen, He or Ar; and |
| Exhaust Velocity: | 200 CFM (High velocity nozzle - debris/gas extraction system). |

In such applications, the method of the present invention may be used to manufacture stable microstructure electrode elements 24E having an aspect ratio of >10:1 and approaching <50:1, where the post dimensions are <500 microns on each side if the elements 24E are square, <ø500 if the elements 24E are circular, or <500 if the elements 24E are of various polygonal shapes.

It is to be appreciated that a preferred polyvinyl alcohol ("PVA") for use with the present invention as the water soluble filler or coating is a polyvinyl alcohol sold by E.I. du Pont de Nemours and Company ("Dupont") under the Trade Name ELVANOL as Grade 52-22. It is to be appreciated that other grades and sources of polyvinyl alcohol as well as other kinds of water soluble fillers or coatings, e.g., salts for example, would work as well.

The substrate is preferably a substrate manufactured in accordance with U.S. Pat. No. 6,563,998 and the teachings and disclosures of that patent are incorporated into this patent application by reference.

Since certain changes may be made in the above described method for manufacturing three dimensional micro-battery electrode arrays without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A method for forming an array of three dimensional electrode elements, the method comprising the steps of:
   forming a substrate of a material suitable for use as an electrode element,
   forming a plurality of first parallel channels in the substrate, each of the plurality of first parallel channels being oriented in a first direction,
   filling the plurality of first parallel channels with a sacrificial filler material to support and stabilize the substrate and facilitate cutting with one of a laser and a micro-saw,
   forming at least one plurality of second parallel channels in the substrate by cutting with the one of the laser and the micro-saw so that each plurality of the first parallel channels being non-parallel to each of the plurality of second parallel channels, and
   removing the sacrificial filler material to leave a grid array of electrode elements.

2. The method of claim 1 for forming an array of three dimensional electrode elements, further comprising:
   a preliminary step of depositing a sacrificial coating onto the surface of the substrate, and
   a final step of removing the sacrificial coating and any debris resulting from the channel forming steps deposited thereon.

3. The method of claim 1 for forming an array of three dimensional electrode elements, further comprising the step of using a polymer substrate comprised of one of a polyimide film, a photo-resist film and a cast polyimide wafer as the substrate.

4. The method of claim 3 for forming an array of three dimensional electrode elements, wherein the substrate is one of a polyimide wafer and a polyimide/amide substrate and is one of compression cast and isostatically compression molded.

5. The method of claim 1 for forming an array of three dimensional electrode elements, further comprising the step of forming the plurality of first and second parallel channels as blind depth channels.

6. The method of claim 1 for forming an array of three dimensional electrode elements, wherein the plurality of first and second parallel channels are formed by one of repeated laser machining steps using one of a single UV (ultraviolet) laser beam and a focal or imaged UV or IR (infra-red) laser spot and the formation of multiple channels in a single laser machining step by the concurrent use of multiple UV laser beams.

7. The method of claim 1 for forming an array of three dimensional electrode elements, further comprising the step of using one of a water soluble material and a solvent soluble material as the sacrificial filler material.

8. The method of claim 2 for forming an array of three dimensional electrode elements, further comprising the step of using a water soluble coating as the sacrificial coating.

9. The method of claim 2 for forming an array of three dimensional electrode elements, further comprising the step of using polyvinyl alcohol as the sacrificial coating.

10. A method for forming an array of three dimensional electrode elements, the method comprising the steps of:
    forming a substrate of a material suitable for use as an electrode element,
    forming a plurality of first linear parallel channels in the substrate with each of the plurality of first linear parallel channels being spaced apart and parallel to one another and extending solely in a longitudinal direction from an initiation end to a termination end,
    filling the plurality of first linear parallel channels with a sacrificial filler material to support and stabilize the substrate and facilitate cutting of the substrate with one of a laser and a micro-saw,
    cutting a plurality of second linear parallel channels in the substrate with the one of the laser and the micro-saw so that each plurality of the first parallel channels being substantially normal to each of the plurality of second parallel channels, and each of the plurality of second linear parallel channels being spaced apart and parallel to one another and extending solely in a longitudinal direction from an initiation end to a termination end, and
    removing the sacrificial filler material to leave a grid array of electrode elements.

11. The method of claim 10 for forming an array of three dimensional electrode elements, further comprising:
    a preliminary step of depositing a sacrificial coating onto the surface of the substrate, and
    a final step of removing the sacrificial coating and any debris resulting from the channel forming steps deposited thereon.

12. The method of claim 10 for forming an array of three dimensional electrode elements, further comprising the step of using a polymer substrate comprised of one of a polyimide film, a photo-resist film and a cast polyimide wafer as the substrate.

13. The method of claim 12 for forming an array of three dimensional electrode elements, wherein the substrate is one of a polyimide wafer and a polyimide/amide substrate and is one of compression cast and isostatically compression molded.

14. The method of claim 10 for forming an array of three dimensional electrode elements, further comprising the step of forming the plurality of first and second parallel channels as blind depth channels.

15. The method of claim 10 for forming an array of three dimensional electrode elements, wherein the plurality of first and second parallel channels are formed by one of repeated laser machining steps using one of a single UV (ultraviolet) laser beam and a focal or imaged UV or IR (infra-red) laser spot and the formation of multiple channels in a single laser machining step by the concurrent use of multiple UV laser beams.

16. The method of claim 10 for forming an array of three dimensional electrode elements, further comprising the step of using one of a water soluble material and a solvent soluble material as the sacrificial filler material.

17. The method of claim 11 for forming an array of three dimensional electrode elements, further comprising the step of using a water soluble coating as the sacrificial coating.

18. The method of claim 11 for forming an array of three dimensional electrode elements, further comprising the step of using polyvinyl alcohol as the sacrificial coating.

19. An array of three dimensional electrode elements formed by a method, the method comprising the steps of:

forming a substrate from one of a polyimide and a polyimide/amide, forming at least four first linear parallel channels in the substrate with each of the at least four first linear parallel channels being spaced apart and parallel to one another and extending solely in a longitudinal direction from an initiation end to a termination end, filling the at least four first linear parallel channels with a sacrificial filler material to support and stabilize the substrate and facilitate cutting with one of a laser and a micro-saw, such sacrificial filler material being one of a water soluble material and a solvent soluble material, forming a plurality of second linear parallel channels by cutting with the one of the laser and the micro-saw, each of the at least four first linear parallel channels extending normal to each of the plurality of second linear parallel channels, and removing the sacrificial filler material to leave a grid array of electrode elements.

20. The array of three dimensional electrode elements of claim 19, further comprising:

a preliminary step of depositing a water soluble sacrificial coating onto the surface of the substrate, and a final step of removing the sacrificial coating and any debris resulting from the channel forming steps deposited thereon.

* * * * *